(12) United States Patent
Ikeuchi et al.

(10) Patent No.: US 10,396,372 B2
(45) Date of Patent: Aug. 27, 2019

(54) ELECTROLYTIC SOLUTION CIRCULATION TYPE BATTERY

(71) Applicant: Sumitomo Electric Industries, Ltd., Osaka-shi (JP)

(72) Inventors: Atsuo Ikeuchi, Osaka (JP); Takahiro Kumamoto, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/327,329

(22) PCT Filed: Jul. 3, 2015

(86) PCT No.: PCT/JP2015/069225
§ 371 (c)(1),
(2) Date: Jan. 18, 2017

(87) PCT Pub. No.: WO2016/013377
PCT Pub. Date: Jan. 28, 2016

(65) Prior Publication Data
US 2017/0194660 A1 Jul. 6, 2017

(30) Foreign Application Priority Data
Jul. 25, 2014 (JP) .................. 2014-152431

(51) Int. Cl.
*H01M 8/04082* (2016.01)
*H01M 8/18* (2006.01)
*H01M 8/04* (2016.01)

(52) U.S. Cl.
CPC ......... *H01M 8/04201* (2013.01); *H01M 8/04* (2013.01); *H01M 8/18* (2013.01); *H01M 8/188* (2013.01); *Y02E 60/528* (2013.01)

(58) Field of Classification Search
None
See application file for complete search history.

(56) References Cited

U.S. PATENT DOCUMENTS 3,751,225 A * 8/1973 Karlson .................. A61L 2/202
422/116
6,244,441 B1 * 6/2001 Ahlgren ................ B32B 27/322
206/522

(Continued)

FOREIGN PATENT DOCUMENTS

JP      01-265825 A    10/1989
JP    2002-175825 A     6/2002

(Continued)

OTHER PUBLICATIONS

Takeda et al. (JP, 01-265825) (a raw machine translation) (Abstract) (Year: 1989).*

(Continued)

*Primary Examiner* — Carmen V Lyles-Irving
(74) *Attorney, Agent, or Firm* — Baker Botts L.L.P.; Michael A. Sartori

(57) ABSTRACT

An electrolytic solution circulation type battery includes a tank which stores an electrolyte to be circulated to a battery cell, and a pressure adjustment mechanism configured to adjust the pressure of a gas phase portion in the tank. The pressure adjustment mechanism includes a pressure adjustment bag which is provided outside the tank and expands or contracts in response to changes in pressure of the gas phase portion in the tank.

6 Claims, 4 Drawing Sheets

(56) References Cited

U.S. PATENT DOCUMENTS

| | | | |
|---|---|---|---|
| 2003/0022059 A1* | 1/2003 | Ito .................... | H01M 2/1288 |
| | | | 429/71 |
| 2005/0202309 A1* | 9/2005 | Nakagawa ............ | H01M 8/241 |
| | | | 429/49 |
| 2011/0045324 A1* | 2/2011 | Kritzer ................ | H01M 2/1077 |
| | | | 429/53 |

FOREIGN PATENT DOCUMENTS

| | | |
|---|---|---|
| JP | 2007-311209 A | 11/2007 |
| JP | 2009-289535 A | 12/2009 |
| JP | 2010-170782 A | 8/2010 |
| JP | 2014-127263 A | 7/2014 |
| WO | 2012/117543 A1 | 9/2012 |

OTHER PUBLICATIONS

Takeda et al. (JP, 01-265825) (a raw machine translation) (Detailed Description) (Year: 1989).*
International Search Report in counterpart International Application No. PCT/JP2015/069225, dated Sep. 29, 2015.

* cited by examiner

4C: 40, 42, 5
50: 51, 51L, 52, 53
7: 70, 71, 72, 73

ELECTROLYTIC SOLUTION CIRCULATION TYPE BATTERY

TECHNICAL FIELD

The present invention relates to an electrolytic solution circulation type battery such as a redox flow battery. More particularly, the invention relates to an electrolytic solution circulation type battery including a pressure adjustment mechanism having excellent maintainability and an electrolytic solution circulation type battery in which the pressure adjustable range inside the tank is wide.

BACKGROUND ART

An electrolytic solution circulation type battery such as a redox flow battery (RF battery) is a large capacity storage battery that stores power derived from natural energy obtained by photovoltaic power generation, wind power generation, or the like. An RF battery, which is typically connected, through an AC/DC converter, between a power generation unit (such as photovoltaic power generating equipment, wind power generation equipment, or a general power plant) and a load (such as a consumer), charges and stores electricity generated by the power generation unit and discharges and supplies stored electricity to the load.

For example, as shown in FIG. 4 which is an operating principle diagram for an RF battery, an RF battery 100 includes a battery cell 10 which is separated into a positive electrode cell 12 and a negative electrode cell 11 by a separator 11 that allows hydrogen ions to permeate. The positive electrode cell 12 contains a positive electrode 14 and is connected to a positive electrode electrolyte tank 20 that stores a positive electrode electrolyte via a circulation passage including a supply flow path 30 and a discharge flow path 32. Similarly, the negative electrode cell 13 contains a negative electrode 15 and is connected to a negative electrode electrolyte tank 21 that stores a negative electrode electrolyte via a circulation passage including a supply flow path 31 and a discharge flow path 33.

The electrolytes in the positive electrode electrolyte tank 20 and the negative electrode electrolyte tank 21 are supplied from the supply flow paths 30 and 31 to the cells 12 and 13 by pumps 34 and 35 provided in the middle of the supply flow paths 30 and 31, discharged from the cells 12 and 13 through the discharge flow paths 32 and 33 to the positive electrode electrolyte tank 20 and the negative electrode electrolyte tank 21, and thus circulated within the cells 12 and 13, respectively. While circulating the electrolytes in such a manner, charging and discharging are performed using the difference in oxidation-reduction potential between ions contained in the positive electrode electrolyte and ions contained in the negative electrode electrolyte. In FIG. 4, vanadium ions are shown as ions contained in the electrode electrolytes. Solid line arrows indicate charging and dashed line arrows indicate discharging.

In order to prevent oxidation of the electrolytes, the positive electrode electrolyte tank 20 and the negative electrode electrolyte tank 21 are hermetically sealed such that entry of the air is blocked. The pressure of a gas phase portion 20g or 21g in the positive electrode electrolyte tank 20 or negative electrode electrolyte tank 21 becomes negative (less than the atmospheric pressure) when the temperature of the gas phase portion 20g or 21g decreases or the liquid surface of the electrolyte falls at the start of circulation to increase the volume of the gas phase portion 20g or 21g. On the other hand, the pressure of the gas phase portion 20g or 21g in the positive electrode electrolyte tank 20 or negative electrode electrolyte tank 21 becomes positive (greater than the atmospheric pressure) when the temperature of the electrolyte increases or the volume of the gas phase portion 20g or 21g decreases. When the positive electrode electrolyte tank 20 or negative electrode electrolyte tank 21 excessively deforms (expands/contracts) as a result of the positive pressure/negative pressure, there is a concern that the positive electrode electrolyte tank 20 or negative electrode electrolyte tank 21 may be damaged. In particular, when deformation (expansion/contraction) occurs repeatedly, the positive electrode electrolyte tank 20 or negative electrode electrolyte tank 21 is likely to be damaged.

For example, as shown in FIG. 4, in PTL 1, a breathing bag (pressure adjustment bag) 110 is provided in each of the gas phase portions 20g and 21g of the positive electrode electrolyte tank 20 and the negative electrode electrolyte tank 21, the breathing bag (pressure adjustment bag) 110 being suspended from the top wall of each of the positive electrode electrolyte tank 20 and the negative electrode electrolyte tank 21 (refer to PTL 1). The inside of the breathing bag 110 communicates with the atmosphere. When the pressure of the gas phase portion 20g or 21g becomes negative, the breathing bag 110 takes in the atmosphere and expands to reduce the volume of the gas phase portion 20g or 21g, thereby increasing the pressure of the gas phase portion 20g or 21g. On the other hand, when the pressure of the gas phase portion 20g or 21g becomes positive, the breathing bag 110 discharges the internal gas to the atmosphere and contracts to increase the volume of the gas phase portion 20g or 21g, thereby decreasing the pressure of the gas phase portion 20g or 21g. In such a manner, it is possible to suppress the expansion/contraction of the positive electrode electrolyte tank 20 or negative electrode electrolyte tank 21 as a result of the positive pressure/negative pressure of the gas phase portion 20g or 21g.

CITATION LIST

Patent Literature

PTL 1: Japanese Unexamined Patent Application Publication No. 2002-175825

SUMMARY OF INVENTION

Technical Problem

Since the pressure adjustment bag is provided inside the tank as described above, maintenance of the pressure adjustment bag becomes very complicated. The tank is opened in order to visually check whether or not the pressure adjustment bag is operating normally or replace the pressure adjustment bag. In order to open the tank, it is necessary to discharge the RF battery so as to prevent oxidation of the electrolyte.

Furthermore, in the case of the pressure adjustment bag arranged inside the tank, the adjustable range of pressure of the gas phase portion is narrow. The reason for this is that the volume of the pressure adjustment bag is restricted by the volume of the gas phase portion in the tank.

The present invention has been accomplished under these circumstances, and an object of the present invention is to provide an electrolytic solution circulation type battery including a pressure adjustment mechanism having excellent maintainability.

Another object of the present invention is to provide an electrolytic solution circulation type battery in which the pressure adjustable range inside the tank is wide.

Solution to Problem

An electrolytic solution circulation type, battery according to an embodiment of the present invention includes a tank which stores an electrolyte to be circulated to a battery cell. The electrolytic solution circulation type battery includes a pressure adjustment mechanism configured to adjust the pressure of a gas phase portion in the tank. The pressure adjustment mechanism includes a pressure adjustment bag which is provided outside the tank and expands or contracts in response to changes in pressure of the gas phase portion in the tank.

Advantageous Effects of Invention

In the electrolytic solution circulation type battery, the pressure adjustment bag has excellent maintainability. Furthermore, the volume of the pressure adjustment bag to be provided is not greatly restricted.

REFERENCE SIGNS LIST

Figure 1:
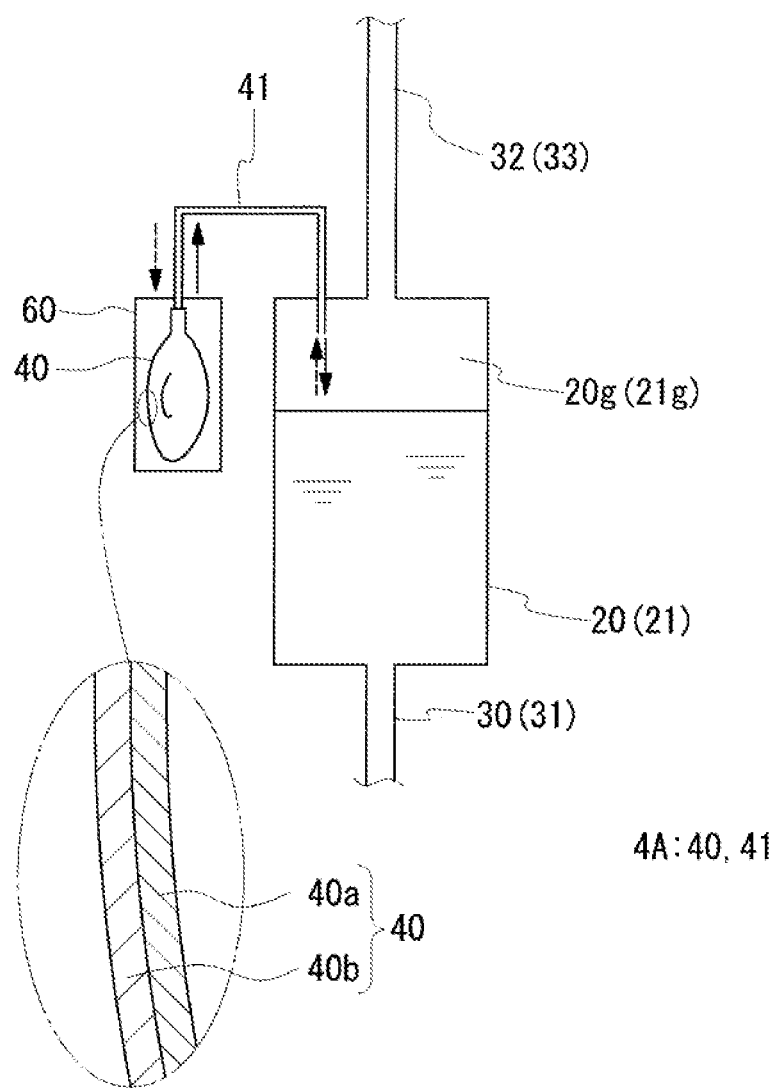
FIG. 1 is a schematic diagram showing a pressure adjustment mechanism of a redox flow battery according to Embodiment 1.

100 RF battery
10 battery cell
11 separator
12 positive electrode cell
13 negative electrode cell
14 positive electrode
15 negative electrode
20 positive electrode electrolyte tank
20$g$ gas phase portion
21 negative electrode electrolyte tank
21$g$ gas phase portion
30, 31 supply flow path
32, 33 discharge flow path
34, 35 pump
4A, 4B, 4C pressure adjustment mechanism
40 pressure adjustment bag
40$a$ corrosion protection layer
40$b$ oxygen barrier layer
41 direct duct
42 communicating duct
5 gas discharge mechanism
50 water seal valve
51 container
51$g$ gas phase portion
51L pressure regulating liquid
52 connecting pipe
53 discharge pipe
60 box
7 gas supply mechanism
70 gas supply source
71 gas supply duct
72 flow meter
73 valve
110 breathing bag (pressure adjustment bag)

DESCRIPTION OF EMBODIMENTS

Description of Embodiments of the Present Invention

First, contents of embodiments of the present invention are enumerated and described.

(1) An electrolytic solution circulation type battery according to an embodiment of the present invention includes a tank which stores an electrolyte to be circulated to a battery cell. The electrolytic solution circulation type battery includes a pressure adjustment mechanism configured to adjust the pressure of a gas phase portion in the tank. The pressure adjustment mechanism includes a pressure adjustment bag which is provided outside the tank and expands or contracts in response to changes in pressure of the gas phase portion in the tank.

According to the configuration described above, the pressure adjustment bag has excellent maintainability. By providing the pressure adjustment bag outside the tank, it is possible to visually check whether or not the pressure adjustment bag is operating normally or replace the pressure adjustment bag without opening the tank. Since it is not necessary to open the tank, it is not necessary to discharge the RF battery so as to prevent oxidation of the electrolyte.

Furthermore, there are less restrictions regarding the volume of the pressure adjustment bag than in the case where the pressure adjustment bag is installed inside the tank.

Assuming that the size of the tank and the volume of the pressure adjustment bag are the same as those in the case where the pressure adjustment bag is provided inside the tank, it is possible to increase the amount of the electrolyte. Consequently, the battery capacity can be increased.

Assuming that the amount of the electrolyte in the tank and the volume of the pressure adjustment bag are the same as those in the case where the pressure adjustment bag is provided inside the tank, the size of the tank can be decreased. Consequently, the tank installation space can be decreased, and the remaining space can be effectively used.

(2) In the electrolytic solution circulation type battery according to the embodiment, the pressure adjustment mechanism may include a gas discharge mechanism configured to discharge gas of the gas phase portion in the tank to the outside of the tank.

According to the configuration described above, by providing the gas discharge mechanism, the positive pressure of the gas phase portion can be satisfactorily suppressed. Furthermore, since the positive pressure of the gas phase portion can be suppressed by the gas discharge mechanism, the pressure adjustment bag can be exclusively used to suppress the negative pressure of the gas phase portion. Therefore, the positive pressure and the negative pressure of the gas phase portion can be effectively suppressed. In particular, since it is possible to exclusively use the pressure adjustment bag to suppress the negative pressure of the gas phase portion, assuming that the volume of the pressure adjustment bag is the same as that in the case where the pressure adjustment bag is used to suppress both the positive pressure and the negative pressure, it is possible to widen the range in which the negative pressure can be suppressed.

(3) The electrolytic solution circulation type battery according to the embodiment may include a gas supply mechanism configured to supply a flow gas including an inert gas through a gas supply duct to the gas phase portion.

According to the configuration described above, by providing the gas supply mechanism, a flow gas can be supplied to the gas phase portion in the tank to dilute generated gas filling the gas phase portion. Therefore, for example, when provided with the gas discharge mechanism or the like, the generated gas can be discharged at a low concentration into the atmosphere. The generated gas refers to gas generated under the influence of impurities mixed in the electrolyte or the like. By ventilating the inside of the tank in such a manner, it is possible to prevent stagnation of generated harmful gas in the tank. In particular, by constantly supplying the flow gas, the generated gas in the gas phase portion can be always maintained at a low concentration.

(4) in the electrolytic solution circulation type battery according to the embodiment, when provided with the gas supply mechanism, the pressure adjustment bag may communicate with the gas phase portion through the gas supply duct.

According to the configuration described above, since the flow gas is supplied to the gas phase portion through the gas supply duct, it is possible to easily suppress backflow of a mist containing constituent materials of the electrolyte (e.g., sulfuric acid) into the pressure adjustment bag, compared with the case where the pressure adjustment bag is directly connected to the gas phase portion. Therefore, the pressure adjustment bag is prevented from being damaged by the mist, such as having holes therein.

(5) The electrolytic solution circulation type battery according to the embodiment may include a box which contains the pressure adjustment bag and bears the internal pressure of the pressure adjustment bag due to expansion.

According to the configuration described above, since the box which bears the internal pressure of the pressure adjustment bag is provided, explosion of the pressure adjustment bag can be effectively prevented. Furthermore, since the internal pressure of the pressure adjustment bag is borne by the box, a material having low pressure resistance can be used as a material for the pressure adjustment bag, and it is possible to increase the freedom of selection of the material for the pressure adjustment bag. Moreover, the pressure adjustment bag can be mechanically protected.

(6) in the electrolytic solution circulation type battery according to the embodiment, preferably, the pressure adjustment bag is made of a layered material including a corrosion protection layer and an oxygen barrier layer disposed on an outer periphery thereof.

According to the configuration described above, since the corrosion protection layer is provided, even if a mist containing constituent materials of the electrolyte or the like is mixed into the pressure adjustment bag, corrosion of the pressure adjustment bag can be suppressed. Therefore, the pressure adjustment bag is prevented from being damaged, such as having holes therein.

Since the oxygen barrier layer is disposed on the outer periphery of the corrosion protection layer, the air (oxygen) is prevented from entering the pressure adjustment bag. Consequently, the air is not transported from the pressure adjustment bag to the gas phase portion, and oxidation of the electrolyte can be prevented.

(7) In the electrolytic solution circulation type battery according to the embodiment, the volume of the pressure adjustment bag may be $1/30$ to $1/2$ of the volume of the gas phase portion.

According to the configuration described above, by setting the volume of the pressure adjustment bag to be $1/30$ or more of the volume of the gas phase portion, pressure adjustment can be performed effectively. By setting the volume of the pressure adjustment bag to be $1/2$ or less of the volume of the gas phase portion, the installation space of the pressure adjustment bag does not become excessively large.

DETAILED DESCRIPTION OF EMBODIMENTS OF THE PRESENT INVENTION

Embodiments of the present invention will be described in detail below with reference to the drawings. It is intended that the present invention is not limited to the examples shown in the embodiments, but is determined by appended claims, and includes all variations of the equivalent meaning and ranges to the claims. Herein, a description will be made on a redox flow battery (RF battery) as an example of an electrolytic solution circulation type battery.

Embodiment 1

Figure 4:
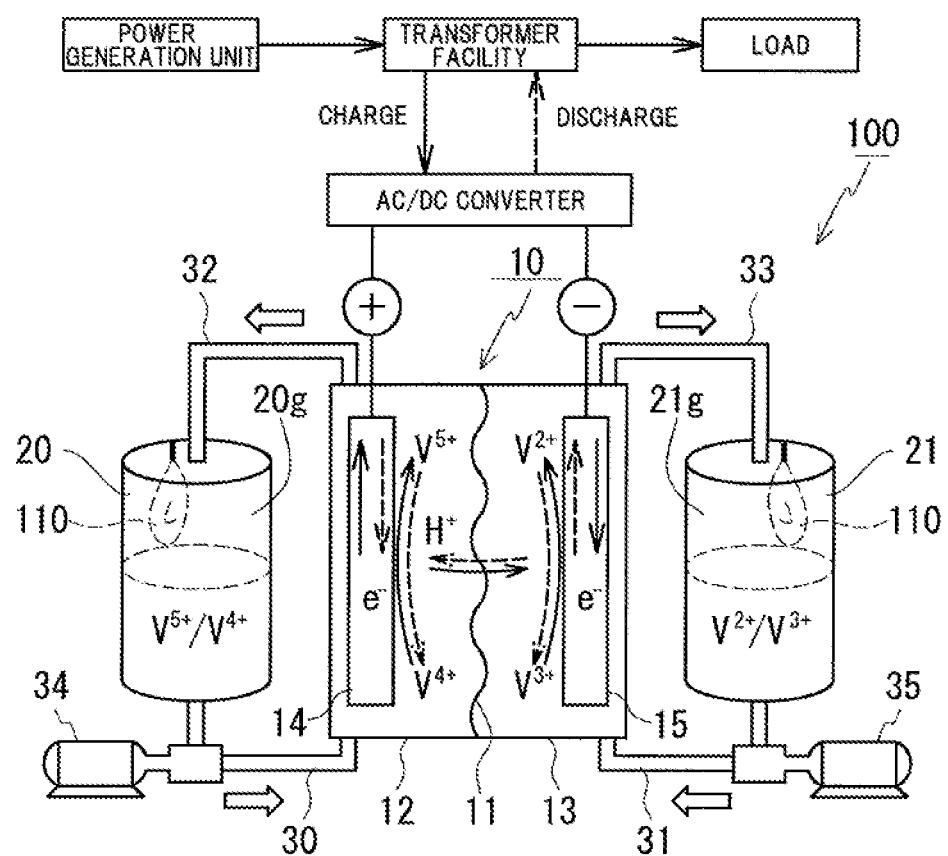
FIG. 4 is an operating principle diagram of a redox flow battery.

An RF battery according to Embodiment 1 includes, as in the existing RF battery 100 described with reference to FIG. 4, a battery cell 10, a tank 20 which stores a positive electrode electrolyte to be circulated to a positive electrode cell 12, and a tank 21 which stores a negative electrode electrolyte to be circulated to a negative electrode cell 13. The electrode electrolytes are circulated through circulation passages (supply flow paths 30 and 31 and discharge flow paths 32 and 33) by pumps 34 and 35 provided in the middle of the corresponding circulation passages. The RF battery according to Embodiment 1 is mainly characterized in that a pressure adjustment mechanism configured to adjust the pressure of a gas phase portion in the tank includes a pressure adjustment bag which is provided outside the tank. That is, since the structure of the periphery of the tank of the RP battery according to Embodiment 1 differs from that of the existing RF battery, a description will be made, focusing on the difference, with reference to FIG. 1 (appropriately FIG. 4). The same components as those of the existing battery are designated by the same reference signs as those in FIG. 4, and a description thereof will be omitted.

Pressure Adjustment Mechanism

A pressure adjustment mechanism 4A is configured to adjust the pressure of a gas phase portion 20g or 21g of a positive electrode electrolyte tank 20 or negative electrode electrolyte tank 21. In this example, the pressure adjustment mechanism 4A includes a pressure adjustment bag 40 which expands or contracts in response to changes in pressure (positive pressure and negative pressure) of the gas phase portion 20g or 21g of the positive electrode electrolyte tank 20 or negative electrode electrolyte tank 21. The pressure adjustment bag 40 is provided outside the positive electrode electrolyte tank 20 or negative electrode electrolyte tank 21 and is connected, through a direct duct 41 which communicates with the gas phase portion 20g or 21g, to the positive electrode electrolyte tank 20 or negative electrode electrolyte tank 21. In this example, each of the positive electrode electrolyte tank 20 and the negative electrode electrolyte tank 21 is provided with the pressure adjustment bag 40.

However, only one of the positive electrode electrolyte tank 20 and the negative electrode electrolyte tank 21 may be provided with the pressure adjustment bag 40.

(Pressure Adjustment Bag)

The pressure adjustment bag 40 adjusts the pressure of the gas phase portion 20g or 21g by expansion or contraction, thereby suppressing excessive deformation (expansion and contraction) of the positive electrode electrolyte tank 20 or negative electrode electrolyte tank 21 and suppressing explosion and compression of the positive electrode electrolyte tank 20 or negative electrode electrolyte tank 21. The pressure adjustment bag 40 has both a function of suppressing positive pressure and a function of suppressing negative pressure of the gas phase portion 20g or 21g.

<Positive Pressure Suppression>

In the case where positive pressure is suppressed by the pressure adjustment bag 40, for example, the pressure adjustment bag 40 is maintained in a contracted state. When the pressure of the gas phase portion 20g or 21g becomes positive (e.g., 0.1 to 10 kPa greater than the atmospheric pressure), as indicated by thick broken-line arrows in FIG. 1, the pressure adjustment bag 40 takes in gas of the gas phase portion 20g or 21g and expands. The gas is an inert gas which will be described later. Thus, the pressure of the gas phase portion 20g or 21g is decreased to approximately the atmospheric pressure. The pressure of the gas phase portion 20g or 21g may become positive, for example, under the influence of the outside air temperature or because of an increase in the temperature of the gas phase portion 20g or 21g, or a decrease in the volume of the gas phase portion 20g or 21g, due to a rise of the liquid surface of the electrolyte.

<Negative Pressure Suppression>

In the case where negative pressure is suppressed by the pressure adjustment bag 40, an inert gas is stored in the pressure adjustment bag 40. When the pressure of the gas phase portion 20g or 21g becomes negative (e.g. 0.1 to 10 kPa less than the atmospheric pressure), as indicated by thick solid-line arrows in FIG. 1, the pressure adjustment bag 40 contracts and supplies the inert gas inside the pressure adjustment bag 40 to the gas phase portion 20g or 21g. Thus, the pressure of the gas phase portion 20g or 21g is increased to approximately the atmospheric pressure. The pressure of the gas phase portion 20g or 21g may become negative, for example, because of a decrease in the temperature of the gas phase portion 20g or 21g or an increase in the volume of the gas phase portion 20g or 21g due to a fall of the liquid surface of the electrolyte at the start of circulation.

Examples of the inert gas include noble gases, such as argon and neon, and nitrogen. In particular, nitrogen is preferable from the viewpoint of easy avalability and inexpensiveness.

As described above, the pressure adjustment bag 40 is installed outside the positive electrode electrolyte tank 20 or negative electrode electrolyte tank 21. By providing the pressure adjustment bag 40 outside the positive electrode electrolyte tank 20 or negative electrode electrolyte tank 21, maintainability of the pressure adjustment bag 40 can be enhanced compared with the case where the pressure adjustment bag 40 is provided inside the positive electrode electrolyte tank 20 or negative electrode electrolyte tank 21. By providing the pressure adjustment bag 40 outside the positive electrode electrolyte tank 20 or negative electrode electrolyte tank 21, it is possible to visually check whether or not the pressure adjustment bag 40 is operating normally or replace the pressure adjustment bag 40 without opening the positive electrode electrolyte tank 20 or negative electrode electrolyte tank 21. Since it is not necessary to open the positive electrode electrolyte tank 20 or negative electrode electrolyte tank 21, it is not necessary to discharge the RF battery so as to prevent oxidation of the electrolyte. Furthermore, the volume of the pressure adjustment bag 40 to be provided is not greatly restricted. The reason for this is the volume of the pressure adjustment bag 40 is not restricted by the volume of the gas phase portion 20g or 21g compared with the case where the pressure adjustment bag 40 is installed inside the positive electrode electrolyte tank 20 or negative electrode electrolyte tank 21. Assuming that the size of the positive electrode electrolyte tank 20 or negative electrode electrolyte tank 21 and the volume of the pressure adjustment bag 40 are the same as those in the case where the pressure adjustment bag 40 is provided inside the positive electrode electrolyte tank 20 or negative electrode electrolyte tank 21, it is possible to increase the amount of the electrolyte. Assuming that the amount of the electrolyte in the positive electrode electrolyte tank 20 or negative electrode electrolyte tank 21 and the volume of the pressure adjustment bag 40 are the same as those in the case where the pressure adjustment bag 40 is provided inside the positive electrode electrolyte tank 20 or negative electrode electrolyte tank 21 the size of the positive electrode electrolyte tank 20 or negative electrode electrolyte tank 21 can be decreased.

<Structure and Material>

The pressure adjustment bag 40 may be made of a single-layer sheet material, but preferably made of a layered material in which a plurality of layers are stacked. Specifically, the layered material may include a corrosion protection layer 40a and oxygen barrier layer 40b disposed on an outer periphery thereof.

The corrosion protection layer 40a prevents damage, such as holes, due to degradation by a mist containing components of the electrolyte (e.g., sulfuric acid) or the like. The reason for this is that since the inside of the pressure adjustment bag 40 is directly connected to the gas phase portion 20 or 21g of the positive electrode electrolyte tank 20 or negative electrode electrolyte tank 21, there is a possibility that a mist containing components of the electrolyte (e.g., sulfuric acid) will be mixed into the pressure adjustment bag 40.

As a constituent resin of the corrosion protection layer 40a, a resin that does not react with the electrolyte and has high electrolyte resistance may be used. Specific examples of the resin include polyvinyl chloride (PVC), polypropylene (PP), polyethylene (PE), and polytetrafluoroethylene (PTFE). In particular, PE can be suitably used. Usually, a PE resin has a high oxygen transmission rate and easily allows oxygen to penetrate the inside thereof. However, since the oxygen barrier layer 40b, which will be described later, is provided, it is possible to use a PE resin as a constituent material of the corrosion protection layer 40a. Examples of the PE resin include low-density polyethylene (LDPE) and linear polyethylene (L-LDPE).

The thickness of the corrosion protection layer 40a can be, for example, 100 to 300 μm. When the thickness of the corrosion protection layer 40a is 100 μm or more, pressure resistance can be increased, and when the thickness of the corrosion protection layer 40a is 300 μm or less, although depending on the material, flexibility and transparency can be easily increased.

The oxygen barrier layer 40b prevents entry of oxygen from the outside into the pressure adjustment bag 40. The oxygen barrier layer 40b covers the entire outer periphery of the corrosion protection layer 40a.

As a material for the oxygen barrier layer 40b, a material having a lower oxygen transmission rate than the corrosion protection layer 40a may be used. By forming the oxygen barrier layer 40 using of material having a low oxygen transmission rate, it is possible to prevent entry of oxygen into the corrosion protection layer 40a. The oxygen transmission rate is preferably 300 (cc·20 μm/cm²·day·atm) or less, and more preferably 1 (cc·20 μm/m²·day·atm) or less, in particular, 0.1 (cc·20 μm/m²·day·atm) or less. Specifically, any kind of material can be used as long as it has a low oxygen transmission rate, and the material may be at least one selected from a metallic material, an inorganic material, and an organic material. Examples of the metallic material include aluminum and alloys thereof, iron and alloys thereof, copper and alloys thereof, and magnesium and alloys thereof. Examples of the inorganic material include carbon. Examples of the organic material include ethylene-vinyl alcohol copolymers (saponified ethylene-vinyl acetate random copolymers), polyvinylene chloride resins, polyvinyl alcohol resins, and nylon 6. In particular, an ethylene-vinyl alcohol copolymer is preferable as a material for the oxygen barrier layer 40b.

The thickness of the oxygen barrier layer 40b is preferably, for example, 20 to 300 μm. When the thickness of the oxygen barrier layer 40b is 20 μm or more, entry of oxygen can be satisfactorily prevented. When the thickness of the oxygen barrier layer 40b is 300 μm or less, the thickness is not increased excessively.

Furthermore, the pressure adjustment bag 40 may include a plurality of corrosion protection layers 40a or a plurality of oxygen barrier layers 40b. A single or multilayered protective layer may be disposed on an outer periphery of the oxygen barrier layer 40b. By providing a protective layer oars the outer periphery of the oxygen barrier layer 40b, the oxygen barrier layer 40b can be mechanically protected. The material for the protective layer may be the same resin as that of the corrosion protection layer 40a, such as LDPE, or other resin, such as polyamide (PA), cross-linked PE, high-density PE, or epoxy.

The volume of the pressure adjustment bag 40 is preferably 1/30 to 1/2 of the volume of the gas phase portion 20g or 21g. By setting the volume of the pressure adjustment bag 40 to be 1/30 or more of the volume of the gas phase portion 20g or 21g, pressure adjustment of the gas phase portion 20g or 21g can be performed satisfactorily. By setting the volume of the pressure adjustment bag 40 to be 1/2 or less of the volume of the gas phase portion 20g or 21g, the installation space of the pressure adjustment bag 40 does not become excessively large. In particular, the volume of the pressure adjustment bag 40 is preferably 1/10 to 1/5 of the volume of the gas phase portion 20g or 21g. The volume of the pressure adjustment bag 40 refers to the maximum volume to which the pressure adjustment bag 40 can be expanded.

<Number>

A single or a plurality of pressure adjustment hags 40 may be provided for each of the gas phase portions 20g and 21g. When a plurality of pressure adjustment bags 40 are used, the size of each pressure adjustment bag 40 can be decreased. When a plurality of pressure adjustment bags 40 are used, the total volume of the plurality of pressure adjustment bags 40 is preferably 1/30 to 1/2 of the gas phase portion 20g or 21g.

(Direct Duct)

The direct duct 41 allows the pressure adjustment bag 40 and the gas phase portion 20g or 21g to communicate with each other. One end of the direct duct 41 is open to the pressure adjustment bag 40 and the other end of the direct duct 41 is open to the gas phase portion 20g or 21g. The direct duct 41 has a size that allows the pressure adjustment bag 40 to rapidly expand or contract when the pressure of the gas phase portion 20g or 21g changes. For example, although the size of the direct duct 41 depends on the balance between the length and the inside diameter, a smaller length and a larger inside diameter are preferable. Practically, the length of the direct duct 41 can be set to be about 100 to 10,000 mm, and the inside diameter of the direct duct 41 can be set to be about 5 to 100 mm. As a material for the direct duct 41, a material having excellent corrosion resistance is suitable, as in the corrosion protection layer 40a of the pressure adjustment bag 40.

Box

Preferably, a box 60 which contains the pressure adjustment bag 40 is disposed on the outer periphery of the pressure adjustment bag 40. The box 60 can mechanically protect the pressure adjustment bag 40. In particular, preferably, the box 60 bears the internal pressure of the pressure adjustment bag 40 due to expansion. In that case, explosion of the pressure adjustment bag 40 can be effectively prevented. Furthermore, when the internal pressure of the pressure adjustment bag 40 is borne by the box 60, a material having low pressure resistance can be used as a material for the pressure adjustment bag 40. Accordingly, it is possible to increase the freedom of selection of the material for the pressure adjustment bag 40.

In order to allow the box 60 to bear the internal pressure of the pressure adjustment bag 40, for example, the size of the box 60 is smaller than the volume of the pressure adjustment bag 40. Preferably, the size of the box 60 is 98% or less of the volume of the pressure adjustment bag 40. For example, the size of the box 60 is about 80% or more of the volume of the pressure adjustment bag 40. In FIG. 1, for convenience of explanation, the box 60 is shown larger than the pressure adjustment bag 40.

The box 60 has the functions of mechanical protection and bearing the pressure described above, and furthermore preferably is formed such that the pressure adjustment bag 40 placed therein can be viewed through part of the box 60. For example, at least part of the box 60 may be formed of a transparent member, or part of the box 60 may be formed of a grid-like member. In that case, the pressure adjustment bug 40 can be easily visually checked without opening the box 60.

As a material for the box 60, a material having a strength that can withstand the pressure borne by the box 60 may be used. In addition, when the box 60 is installed outdoors, a material having excellent corrosion resistance and weather resistance is preferable. Examples of the material include stainless steel, PVC, and PE (in particular, resin compositions of PVC and PE with enhanced weather resistance).

Operational Advantages

In the RF battery according to Embodiment 1, by providing the pressure adjustment bag 40 outside the positive electrode electrolyte tank 20 or negative electrode electrolyte tank 21, the pressure adjustment bag 40 has excellent maintainability. Furthermore, by providing the pressure adjustment bag 40 outside the positive electrode electrolyte tank 20 or negative electrode electrolyte tank 21, the volume of the pressure adjustment bag 40 is not greatly restricted, and it is possible to widen the adjustable range of pressure of the gas phase portion 20g or 21g by the pressure adjustment bag 40. Assuming that the size of the positive electrode electrolyte tank 20 or negative electrode electrolyte tank 21 and the volume of the pressure adjustment bag 40 are the same as those in the case where the pressure adjustment bag 40 is provided inside the positive electrode electrolyte tank 20 or negative electrode electrolyte tank 21, it is possible to increase the amount of the electrolyte. Consequently, the battery capacity can be increased. Assuming that the amount of the electrolyte in the positive electrode electrolyte tank 20 or negative electrode electrolyte tank 21 and the volume of the pressure adjustment bag 40 are the same as those in the case where the pressure adjustment bag 40 is provided inside the positive electrode electrolyte tank 20 or negative electrode electrolyte tank 21, the size of the positive electrode electrolyte tank 20 or negative electrode electrolyte tank 21 can be decreased. Consequently, the space for installing the positive electrode electrolyte tank 20 or negative electrode electrolyte tank 21 can be decreased, and the remaining space can be effectively used.

Embodiment 2

Figure 2:
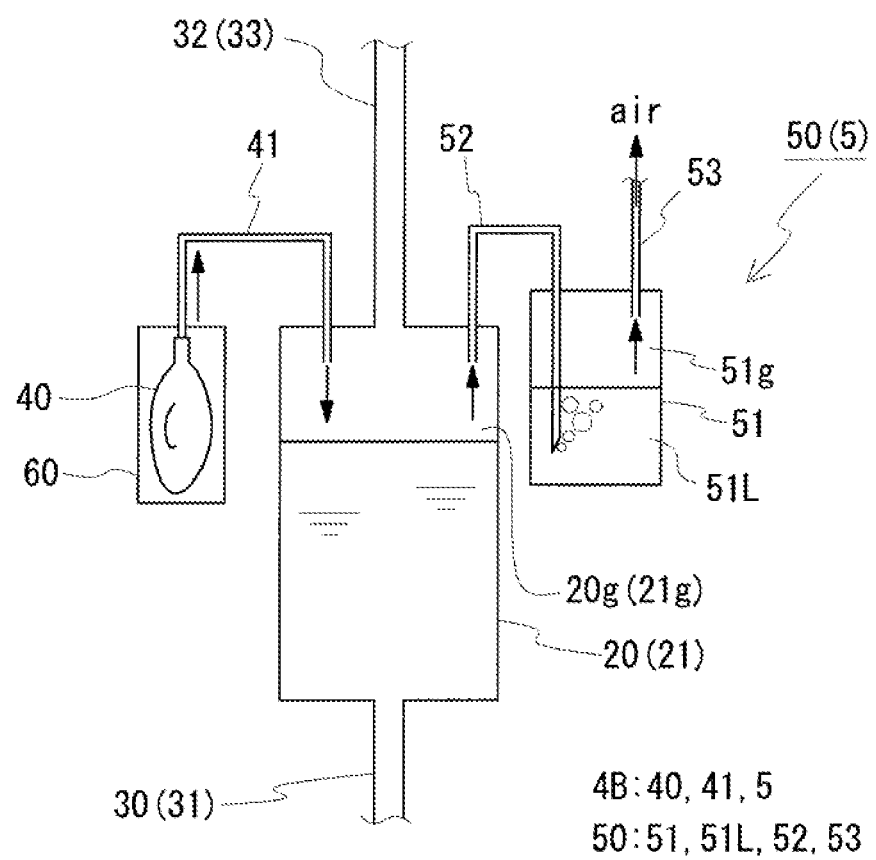
FIG. 2 is a schematic diagram showing a pressure adjustment mechanism of a redox flow battery according to Embodiment 2.

In Embodiment 2, as shown in FIG. 2, a pressure adjustment mechanism 4B includes a pressure adjustment bag 40 and also includes a gas discharge mechanism 5 configured to discharge gas of the gas phase portion 20g or 21g in the positive electrode electrolyte tank 20 or negative electrode electrolyte tank 21 to the outside of the positive electrode electrolyte tank 20 or negative electrode electrolyte tank 21. That is, an RF battery according to Embodiment 2 differs from the RIF battery according to Embodiment 1 in that a gas discharge mechanism 5 is provided, but otherwise Embodiment 2 has the same configuration as that of Embodiment 1. In Embodiment 2, the pressure adjustment bag 40 is used to suppress the negative pressure of the gas phase portion 20g or 21g, and the gas discharge mechanism 5 is used to suppress the positive pressure of the gas phase portion 20g or 21g. The difference from Embodiment 1 will be mainly described below. The same components as those of Embodiment 1 are denoted by the same reference signs, and description thereof is omitted. In FIG. 2, the thick solid-line arrows indicate the flow of gas.

(Gas Discharge Mechanism)

The gas discharge mechanism 5 is configured to discharge gas of the gas phase portion 20g or 21g to the outside of the positive electrode electrolyte tank 20 or negative electrode electrolyte tank 21, thus adjusting the pressure of the gas phase portion 20g or 21g. In such a manner, explosion of the positive electrode electrolyte tank 20 or negative electrode electrolyte tank 21 due to excessive expansion is prevented. In this example, the gas discharge mechanism 5 includes a water seal valve 50.

<Water Seal Valve>

The water seal valve 50 includes a container 51, a pressure regulating liquid 51L stored therein, a connecting pipe 52 which communicates with the gas phase portion 20g or 21g, and a discharge pipe 53 which discharges the gas inside the container 51 to the outside of the container 51. The connecting pipe 52 has one end open to the as phase portion 20g or 21g in the positive electrode electrolyte tank 20 or negative electrode electrolyte tank 21 extends through a gas phase portion in the container 51 and has the other end open in the pressure regulating liquid 51L. The discharge pipe 53 has one end open to the gas phase portion 51g in the container 51 and the other end open to the atmosphere.

The operation of discharging gas of the gas phase portion 20g or 21g by the water seal valve 50 is performed as follows. When the pressure of the gas phase portion 20g or 21g in the positive electrode electrolyte tank 20 or negative electrode electrolyte tank 21 becomes positive 0.1 to 10 kPa greater that the atmospheric pressure), the gas of the gas phase portion 20g or 21g passes through the connecting pipe 52 and is discharged into the pressure regulating liquid 51L in the container 51. The gas discharged into the pressure regulating liquid 51L, in the form of bubbles, rises in the liquid and moves into the gas phase portion 51g in the container 51. The gas of the gas phase portion 51g in the container 51 is discharged through the discharge pipe 53 to the atmosphere as indicated by the thick solid-line arrow of FIG. 2. In such a manner, the positive pressure of the gas phase portion 20g or 21g is suppressed, and the pressure of the gas phase portion 20g or 21g is adjusted to approximately the atmospheric pressure. As a result, explosion of the positive electrode electrolyte tank 20 or negative electrode electrolyte tank 21 due to excessive expansion can be prevented.

As a material for the container 51, for example, a resin such as polyvinyl chloride (PVC) may be used. Polyvinyl chloride is preferable because it has excellent water resistance, acid resistance, alkali resistance, and solvent resistance and is inexpensive. As the pressure regulating liquid 51L, water which is inexpensive and easily available or an aqueous solution can be used. As the aqueous solution, for example, a dilute sulfuric acid solution or the like may be used. The dilute sulfuric acid solution is unlikely to freeze even in a low-temperature environment, and therefore is preferable.

Furthermore, in addition to suppression of the positive pressure of the gas phase portion 20g or 21g the water seal valve 50 also has a function of preventing backflow of the gas into the positive electrode electrolyte tank 20 or negative electrode electrolyte tank 21. The reason for this is that since the end of the connecting pipe 52, which is connected to the gas phase portion 20g or 21g in the positive electrode electrolyte tank 20 or negative electrode electrolyte tank 21, is open in the pressure regulating liquid 51L, the gas of the gas phase portion 51g in the container 51, which communicates through the discharge pipe 53 with the atmosphere, does not flow into the connecting pipe 52.

Preferably, gas removal equipment (not shown) is provided in the middle of the discharge pipe 53. In some cases, under the influence of impurities mixed in the electrolyte, gas may be generated in the circulation passage of the electrolyte (hereinafter, the gas generated in the electrolyte will be referred to as generated gas). For example, in the positive electrode electrolyte, there is a possibility of generation of oxygen, carbon monoxide, carbon dioxide, or the like due to oxidation reactions, and in the negative electrode electrolyte, there is a possibility of generation of hydrogen, hydrogen sulfide, or the like due to reduction reactions. The generated gas is discharged through the discharge pipe 53 to the outside of the positive electrode electrolyte tank 20 or negative electrode electrolyte tank 21 (into the atmosphere). By providing the gas removal equipment, the gas can be discharged into the atmosphere with the generated gas being removed (diluted). As the gas removal equipment, for example, a fitter described in Japanese Unexamined Patent Application Publication No. 2007-311209 or the like may be used.

Furthermore, the gas discharge mechanism 5 may have a structure other than the water seal valve 50. The gas discharge mechanism 5 may include, for example, a pressure gauge provided in the gas phase portion 20g or 21g, a discharge pipe 53 whose one end is open to the gas phase portion 20g or 21g and whose other end is open to the atmosphere, and a valve disposed therebetween. In this structure, the pressure of the gas phase portion 20g or 21g is measured by the pressure gauge, and by opening the valve on the basis of the measurement result, the gas of the gas phase portion 20g or 21g can be discharged to the outside of the positive electrode electrolyte tank 20 or negative electrode electrolyte tank 21.

Operational Advantages

In the RF battery according to Embodiment 2, the negative pressure of the gas phase portion 20g or 21g can be suppressed by the pressure adjustment bag 40, and the positive pressure of the gas phase portion 20g or 21g can be suppressed by the gas discharge mechanism 5. In such a manner, since positive pressure suppression and negative pressure suppression of the gas phase portion 20g or 21g can be performed by different members, positive pressure suppression and negative pressure suppression can be performed effectively. Furthermore, since it is possible to exclusively use the pressure adjustment bag 40 to suppress the negative, pressure of the gas phase portion 20g or 21g, assuming that the volume of the pressure adjustment bag 40 is the same as that in the case where the pressure adjustment bag 40 is used to suppress both the positive pressure and the negative pressure, it is possible to widen the range in which the negative pressure can be suppressed.

Embodiment 3

Figure 3:
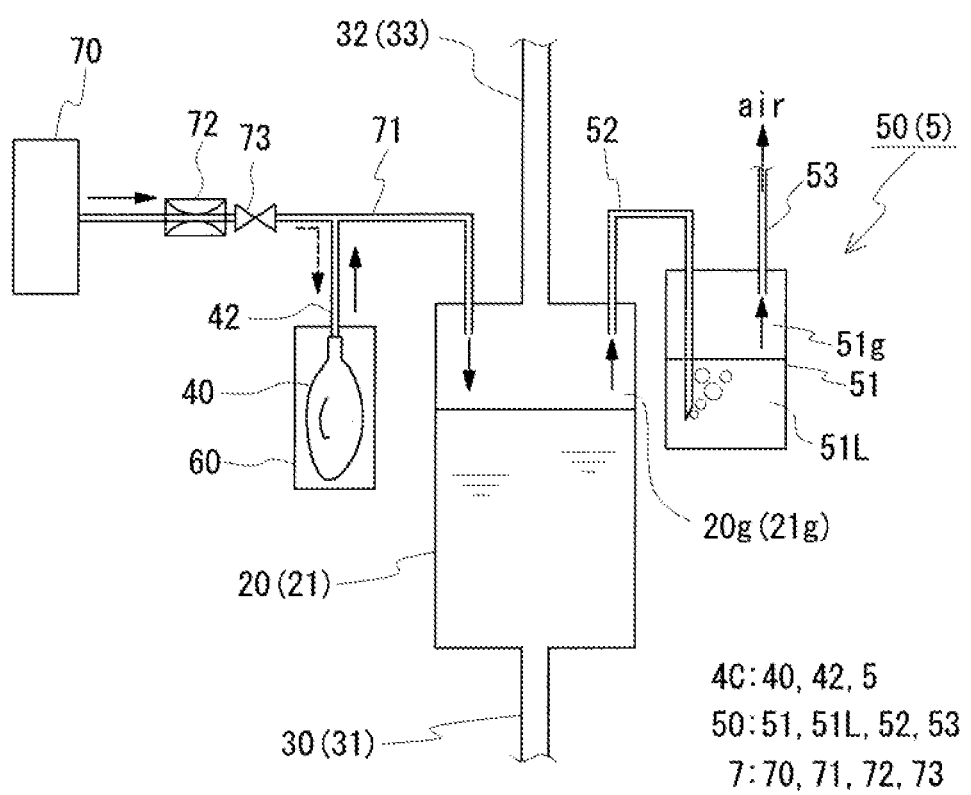
FIG. 3 is a schematic diagram showing a pressure adjustment mechanism and a gas supply mechanism of a redox flow battery according to Embodiment 3.

In Embodiment 3, as shown in FIG. 3, an RF battery is provided with a pressure adjustment mechanism 4C including a pressure adjustment bag 40 and a gas discharge mechanism 5 and may also be provided with a gas supply mechanism 7. That is, the RF battery according to Embodiment 3 differs from the RF battery according to Embodiment 2 in that a gas supply mechanism 7 is provided, but otherwise Embodiment 3 has the same configuration as that of Embodiment 2. The difference from Embodiment 2 will be mainly described below. The same components as those of Embodiment 2 are denoted by the same reference signs, and a description thereof is omitted. In FIG. 3, the thick solid-line arrows and the thick broken-line arrows indicate the flow of gas.

Gas Supply Mechanism

The gas supply mechanism 7 is configured to supply a flow gas including the same inert gas as that described above to the gas phase portion 20g or 21g. Thereby, generated gas filling the gas phase portion 20g or 21g is diluted. The diluted generated gas can be discharged by the gas discharge mechanism 5 to the outside of the positive electrode electrolyte tank 20 or negative electrode electrolyte tank 21. In this example, the gas supply mechanism 7 includes a gas supply source 70 and a gas supply duct 71.

(Gas Supply Source)

The gas supply source 70 stores or generates a flow gas including an inert gas to be supplied to the positive electrode electrolyte tank 20 or negative electrode electrolyte tank 21. The gas supply source 70 may have, for example, a structure including a storing member (cylinder, tank, or the like) for storing an inert gas, or a structure including a gas generator that generates an inert gas. The former structure can be easily fabricated, which is preferable. In the latter structure, it is possible to reduce time and effort for replenishing the inert gas. In particular, in the case of a gas generator that generates nitrogen, since nitrogen can be extracted from the atmosphere, it is possible to semi-permanently supply a flow gas.

The percentage of the inert gas in the flow gas is preferably 99.9% by volume or more. As the percentage is increased, deterioration of the electrolyte due to the flow gas can be suppressed more securely. When the percentage is 99.9% by volume or more, theoretically, it is believed that deterioration of the electrolyte can be suppressed to such an extent that no real operational damage is caused for 10 to 20 years.

(Gas Supply Duct)

A flow gas is supplied from the gas supply source 70 through the gas supply duct 71 to the gas phase portion 20g or 21g in the positive electrode electrolyte tank 20 or negative electrode electrolyte tank 21 (thick solid-line arrow). One end of the gas supply duct 71 is connected to the gas supply source 70, and the other end of the gas supply duct 71 is open to the gas phase portion 20g or 21g of the positive electrode electrolyte tank 20 or negative electrode electrolyte tank 21. Preferably, the gas supply duet 71 is provided with a gas flow control mechanism configured to constantly supply a flow gas to the gas phase portion 20g or 21g.

<Gas Flow Control Mechanism>

The gas flow control mechanism controls the feed rate of at flow gas to be supplied from the gas supply source 70 to the gas phase portion 20g or 21g in the positive electrode electrolyte tank 20 or negative electrode electrolyte tank 21 to a certain rate equal to or more than a predetermined vale. For example, the gas flow control mechanism includes a flow meter 72 and a valve 73. The flow meter 72 measures the flow rate of the flow gas flowing through the gas supply duct 71. The valve 73 controls the flow rate of the flow gas flowing through the gas supply duct 71 by adjusting the valve travel on the basis of the flow rate measured by the flow meter 72 so that the flow rate is at certain value equal to or more than a predetermined value. Determination of the valve travel an the basis of the flow rate and operation of the valve 73 can be performed by a control unit such as a computer (not shown). Preferably, the feed rate of the flow gas to the gas phase portion 20g or 21g in the positive electrode electrolyte tank 20 or negative electrode electrolyte tank 21 is constant, for example, at 0.1 liter/min or more. In such a case, the generated gas of the gas phase portion 20g or 21g can be diluted sufficiently, and by discharging the diluted generated gas by the gas discharge mechanism 5, the gas phase portion 20g or 21g can be ventilated sufficiently.

Pressure Adjustment Mechanism

The pressure adjustment mechanism 4C includes a pressure adjustment bag 40 and a gas discharge mechanism 5 (water seal valve 50) as in Embodiment 2. In this example, the pressure adjustment bag 40 communicates with the gas phase portion 20g or 21g through the gas supply duct 71. Specifically, a communicating duct 42 whose one end is connected to the pressure adjustment bag 40 and whose other end is made to communicate with the middle of the gas supply duct 71 is provided.

When the pressure of the gas phase portion 20g or 21g in the positive electrode electrolyte tank 20 or negative electrode electrolyte tank 21 becomes negative, the pressure adjustment bag 40 contracts and allows the inert gas inside the pressure adjustment bag 40 to flow through communicating duct 42 to be discharged into the gas supply duct 71 as indicated by the thick solid-line arrow in FIG. 3. The inert gas flows together with the inert gas fed from the gas supply source 70 and is supplied to the gas phase portion 20g or 21g. Thus, the pressure of the gas phase portion 20g or 21g is increased to approximately the atmospheric pressure. When the negative pressure of the gas phase portion 20g or 21g is suppressed, part of the inert gas fed from the gas supply source 70 is introduced through the communicating duct 42 into the pressure adjustment bag 40 and stored as indicated by the thick broken-line arrow in FIG. 3.

The gas discharge mechanism 5 discharges the generated gas which has been diluted by the gas supply mechanism 7. When the pressure of the gas phase portion 20g or 21g is made positive by the supply of the flow gas, as described above, the generated gas passes through the connecting pipe 52, the pressure regulating liquid 51L, the gas phase portion 51g in the container 51, and the discharge pipe 53 in that order and is discharged into the atmosphere. Since the generate gas can be diluted by the gas supply mechanism 7, the generated gas can be discharged at a low concentration into the atmosphere.

Operational Advantages

In the RF battery according to Embodiment 3, in addition to negative pressure suppression by the pressure adjustment bag 40, by providing the gas supply mechanism 7, the generated gas can be diluted, and by providing the gas discharge mechanism 5, the generated gas can be discharged at a low concentration into the atmosphere. Therefore, the inside of the positive electrode electrolyte tank 20 or negative electrode electrolyte tank 21 can be ventilated, and it is possible to prevent stagnation of generated harmful gas in the tank. In particular, by constantly supplying the flow gas, the generated gas in the gas phase portion 20g or 21g can be always maintained at a low concentration.

Modification Example 1

In Modification Example 1, a gas phase communicating pipe which connects the gas phase portions of the tanks to each other may be provided. By providing the gas phase communicating pipe, the two tanks can be considered to have one gas phase portion. Therefore, a pressure adjustment bag may be provided only on the gas phase portion of one of the tanks. Furthermore, in the case where a gas discharge mechanism and a gas supply mechanism are provided, as in the pressure adjustment bag, the gas discharge mechanism and the gas supply mechanism each in is be provided only on the gas phase portion of one of the tanks. For example, the pressure adjustment bag and the gas discharge mechanism may be provided on the negative electrode electrolyte tank, and the gas supply mechanism may be provided on the positive electrode electrolyte tank. In this case, when a flow gas is made to flow through the gas supply duct to the positive electrode electrolyte tank, part of the flow gas is introduced into the negative electrode electrolyte tank through the gas phase communicating pipe. In an RF battery, generated harmful gas tends to be generated in the negative electrode electrolyte tank. Therefore, when a flow gas is allowed to flow from the positive electrode electrolyte tank to the negative electrode electrolyte tank in such a manner, it is possible to avoid introduction of generated harmful gas into the positive electrode electrolyte tank. The feed rate of the flow gas may be controlled, for example, such that the feed rate of the flow gas into the gas phase portion in the negative electrode electrolyte tank is 0.1 liter/min or more. Thereby, the gas phase portion in each tank can be ventilated sufficiently.

Modification Example 2

In Modification Example 2, in the case where a gas supply mechanism is provided, the pressure adjustment bag may be directly connected to the gas phase portion through a direct duct instead of being connected through the gas supply duct to the gas phase portion.

INDUSTRIAL APPLICABILITY

Electrolytic solution circulation type batteries according to an embodiment of the present invention can be suitably used, with respect to new energy power generation, such as photovoltaic power generation and wind power generation, for the purpose of stabilizing fluctuation of power output, storing generated power during oversupply, leveling load, and the like. Furthermore, electrolytic solution circulation type batteries according to an embodiment of the present invention can be provided in a general power plant and suitably used as large capacity storage batteries as countermeasures against voltage sag/power failure and for the purpose of leveling load.

The invention claimed is:

1. An electrolytic solution circulation type battery comprising:
    a tank which stores an electrolyte to be circulated to a battery cell; and
    a pressure adjustment mechanism configured to adjust the pressure of a gas phase portion in the tank,
    wherein the pressure adjustment mechanism includes a pressure adjustment bag which is provided outside the tank and expands or contracts in response to changes in pressure of the gas phase portion in the tank,
    the pressure adjustment bag communicates through a duct with the gas phase portion in the tank that contains the electrolyte,
    the pressure adjustment bag is made of a layered material including a corrosion protection layer and an oxygen barrier layer disposed on an outer periphery thereof,
    the corrosion protection layer is formed of a resin selected from the group including polyvinyl chloride, polypropylene, polyethylene, and polytetrafluoroethylene, and
    the oxygen barrier layer is formed of an organic material selected from the group including ethylene-vinyl alcohol copolymers, polyvinylidene chloride resins, polyvinyl alcohol resins, and nylon 6,
    wherein the electrolytic solution circulation type battery further includes a box which contains the pressure adjustment bag and bears the internal pressure of the pressure adjustment bag due to expansion, and a size of the box is smaller than a maximum volume to which the pressure adjustment bag can be expanded,
    wherein the size of the box is 80% or more and 98% or less of the maximum volume to which the pressure adjustment bad can be expanded, and
    wherein at least part of the box is formed of a transparent member.

2. The electrolytic solution circulation type battery according to claim 1, wherein the pressure adjustment mechanism includes a gas discharge mechanism configured to discharge gas of the gas phase portion in the tank to the outside of the tank.

3. The electrolytic solution circulation type battery according to claim 1, further comprising a gas supply mechanism configured to supply a flow gas including an inert gas through a gas supply duct to the gas phase portion.

4. The electrolytic solution circulation type battery according to claim 3, wherein the duct is the gas supply duct.

5. The electrolytic solution circulation type battery according to claim 1, wherein the volume of the pressure adjustment bag is $1/30$ to $1/2$ of the volume of the gas phase portion.

6. The electrolytic solution circulation type battery according to claim 1, wherein one end of the duct is open to the pressure adjustment bag outside the tank and other end of the duct is open to the gas phase portion through a top wall of the tank.

\* \* \* \* \*